Feb. 26, 1963

B. POLL 3,078,816

POT PLANTER

Filed May 2, 1960

INVENTOR
BENJAMIN POLL

BY *Price & Heneveld*

ATTORNEYS

Feb. 26, 1963  B. POLL  3,078,816
POT PLANTER

Filed May 2, 1960  2 Sheets-Sheet 2

INVENTOR
BENJAMIN POLL
BY Price & Heneveld
ATTORNEYS

United States Patent Office 3,078,816
Patented Feb. 26, 1963

3,078,816
POT PLANTER
Benjamin Poll, Holland, Mich., assignor to Holland Transplanter Company, Holland, Mich., a corporation of Michigan
Filed May 2, 1960, Ser. No. 26,160
10 Claims. (Cl. 111—2)

This invention relates to a planting machine. More particularly, this invention relates to a planting machine for planting potted plants, having carrying arms for grasping and depositing a potted plant, the carrying arms being easily converted for planting pots of varying sizes. The machine of this invention is of the general type disclosed in my Patent No. 2,739,548 issued March 26, 1956.

It has been found advantageous to place plants in the ground together with a pot in which they have been planted. By placing both the plant and its pot in the ground, the grower is assured that the roots will not be damaged and proper fertilizer and growing agents surround these roots. Machines are already in existence, as described in my above mentioned patent, having a plurality of arms which grasp all plants at a loading station and carry them to a planting position where they are released from the control of the machine. However, machines presently in existence are not adapted to grasp a potted plant and convey it to planting position. The carrying arms of these machines are adapted to grasp only roots of plants and will not hold and carry pots. Further, carrying arms presently in existence operate in such a manner that the pots would be crushed and improperly placed in the ground. Still further, since plants of varying size require pots of varying size, carrying arms presently in existence cannot facilitate the handling of pots of varying sizes.

It is therefore an object of this invention to provide a carrying arm for a planting machine which is adapted to place potted plants in the ground.

Another object of this invention is to provide such a carrying arm which will not damage the pots to be placed in the ground.

Another object of this invention is to provide such a carrying arm which maintains a firm grip on the pot until it is deposited in the ground, without harming the pot.

Another object of this invention is to provide such a carrying arm which may be readily adapted for facilitating the handling of pots of varying sizes.

Another object of this invention is to provide such a carrying arm which utilizes an improved opening and closing action in the deposition of pots into the ground.

Another object of this invention is to provide in a planting machine a new and improved means for covering the potted plants placed in the ground, this covering means adapted to properly cover pots of varying sizes.

A still further object of this invention is to provide such a planting machine and carrying arm which is simple in construction and inexpensive to fabricate and maintain.

These and other objects of this invention will become obvious to those skilled in the planting art upon reading the following specification in conjunction with the accompanying drawings, wherein.

Briefly, this invention relates to a planting machine for planting potted plants, including a conveying means with a circuitous movement and a plurality of pot grasping arms mounted each at one end in spaced relation to the conveying means. Each of the arms is comprised of a base extending normal to the direction of movement of the conveying means, a supporting prong extending from the free end of the base and a pair of detachable flexible prongs extending from the base, the flexible prongs lying generally parallel to each other and to the supporting prong. A pair of wheels is positioned rearwardly of this conveying means, the wheels spaced from one another for covering the potted plants with a ridge of dirt formed between the wheels. Means is provided for adjusting and changing the distance separating these wheels to correspond with the size of the pots being planted.

Figure 1:
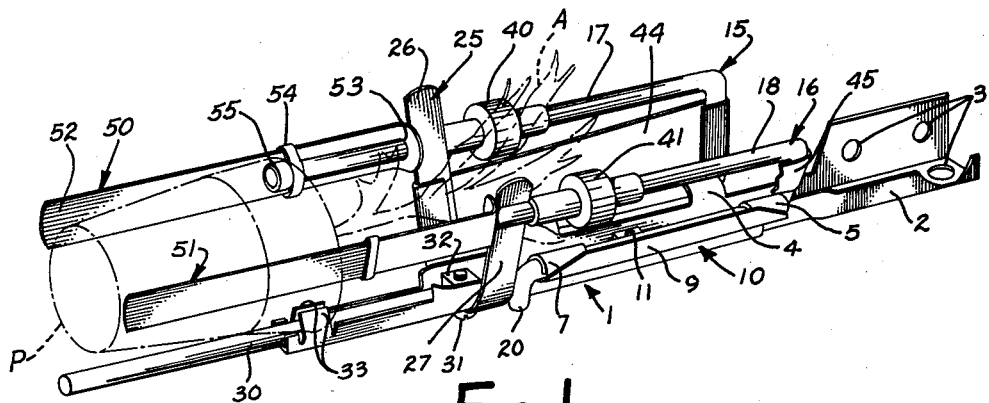
FIG. 1 is an enlarged, side perspective view of the pot carrying arm of this invention, one of the guard shields being broken away to better show the arm.
Figure 4:
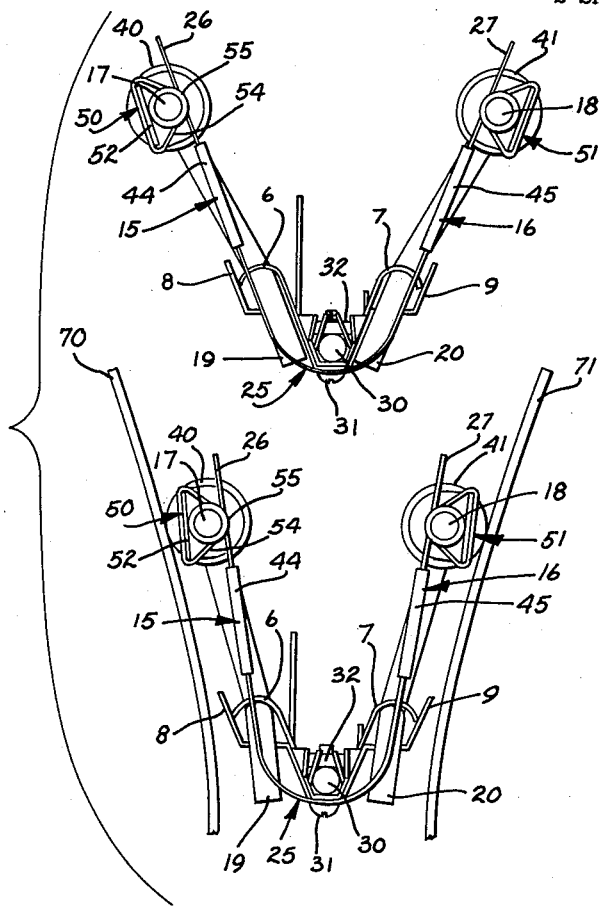
FIG. 4 is an enlarged, front view showing the manner in which the arm in FIG. 1 grasps a pot.

Reference numeral 1 (FIG. 1) designates the pot grasping arm comprising this invention. Such an arm is adapted to be used in a planting machine as described in my Patent No. 2,739,548 issued March 27, 1956. In that patent, such a machine is disclosed in detail and it is believed unnecessary to now describe this machine which is well known to the planting art. Such a machine includes suitable ground-working equipment which operates to open a furrow in the ground ahead of the position where the plants are placed. A conveying means having a circuitous movement is positioned on the machine rearwardly of this ground-working equipment, a plurality of arms secured at one of their ends to the conveying means. As these arms move past a loading station, plants are deposited thereon. A pair of cam plates close the arms as they move downwardly so that the plant is held therein, the plant being released into the furrow when the arm emerges from between the cam plates. This ground-working equipment also includes a furrow-closing device which closes the furrow around the plant to provide the necessary support after it is released by the machine. This plant grasping and conveying system, together with the ground-working apparatus, is mounted on a frame provided with wheels so that the machine may be drawn by a tractor or some other vehicle. The arm 1 includes a base 2, shown as being channel-shaped in cross section. A plurality of openings 3 are provided at one end of the base 2 so that the base may be rigidly affixed to the conveying means having a circuitous movement. When mounted, the base 2 extends normal to the direction of movement of the conveying means. Portions of the material forming the side walls of its channel-shaped cross section are formed to provide bearing members 4, 5, 6 and 7 (FIGS. 1 and 4). The set of bearings 4 and 6 are coaxial, as are the set 5 and 7, and cooperate with the side walls 8 and 9 of the bottom plate 10 to receive the clamping members 15 and 16 as shown, the plate 10 being secured to the base 2 by means of nut and bolt 11. These clamping members are preferably bent from rod material, and include portions 17 and 18 respectively which are spaced from each other and from the base 2. It will be noted that the portions 17 and 18 of the clamping members 15 and 16 are adapted to move towards and away from each other as the clamping members rotate in the bearings 4, 5, 6 and 7.

Figure 2:
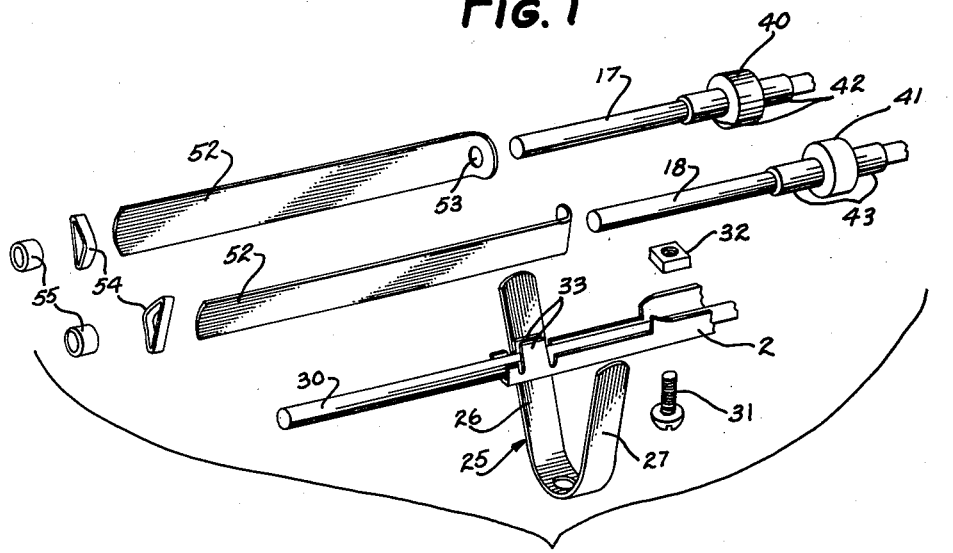
FIG. 2 is an exploded view of the parts of the pot grasping portion of the arm shown in FIG. 1.

As shown best in FIG. 2, a generally V-shaped spring 25 is secured to the base 2 for biasing the clamping members 15 and 16 away from each other. The base 2 is seated within the vertex of the spring 25, the legs 26 and 27 thereof extending between and resting against the portions 17 and 18 of clamping members 15 and 16 respectively. A supporting prong 30 is positioned to lie within the channel-shaped base 2, and extends from the end thereof. A bolt 31 extends through the vertex of the spring 25, through the bottom of the base 2, through the supporting prong 30 and a nut 32 affixes these elements in position. To give the supporting prong 30 added support, ears 33 are struck from the base 2 extending across the supporting prong 30. It will be noted that the spring 25 is secured to the base 2 and held under tension between the clamping members 15 and 16, biasing them outwardly. As will be seen from FIG. 4, downwardly extending extensions 19 and 20 of the clamping members 15 and 16 bear against the sides of the base 2 as the clamping members move apart, limiting such movement.

Roller followers 40 and 41 are rotatably positioned on the portions 17 and 18 of the clamping members 15 and 16 respectively. The roller followers 40 and 41 are held in position for rotation by means of respective pairs of bushings 42 and 43. Guard shields 44 and 45 are secured to the clamping members 15 and 16 and the legs 26 and 27 of the spring 25, closing the area between the portions 17 and 18 of clamping members 15 and 16 and the base 2. The purpose of these guard shields will be more fully explained hereinafter.

A pair of flexible prongs 50 and 51 are detachably secured to the free ends of the portions 17 and 18 of the clamping members 15 and 16. Each flexible prong includes an elongated flexible member 52 having an opening 53 in one end thereof. The ends of the portions 17 and 18 of clamping members 15 and 16 are slidably received by the openings 53. The elongated flexible member 52 is then bent toward the end of its associated portion 17 or 18, bearing against the end of its associated portion and lying generally perpendicular thereto. A clamping member 54 envelops the end of the respective portion and elongated flexible member. The clamping member 54 is thus positioned while the flexible member 52 is under considerable tension, this tension holding the clamping member in position. The flexible member being thus held under tension causes the edges of the openings 53 to bind against the associated portion it envelops. The flexible member is thus prevented from moving with respect to its associated portion due to the great friction arising when one is moved with respect to the other. To assure that the clamping member 54 will not be jarred loose during use of the arm, a collar 55 is positioned on the end of the associated portion of each clamping member.

Figure 3:
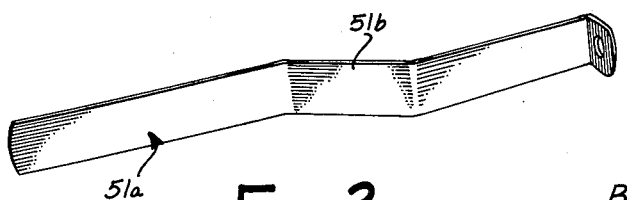
FIG. 3 is an enlarged perspective view of a flexible prong adapted to grasp larger pots.

As will be more fully explained hereinafter, in order to facilitate the use of pots of varying sizes, varying sizes of flexible prongs must be utilized. FIG. 3 shows a flexible prong 51a having a bend 51b therein. When a pair of flexible prongs of this configuration are used, larger pots may be grasped by the arm 1. In order to replace the flexible prong 51, one merely removes the collar 55, presses the flexible member 52 against the portions 17 of the clamping member 15 which allows the clamping member 54 to be removed. The flexible member 52, no longer being under tension, may then be simply removed since the edges of the opening 53 no longer engage the portion 17. The larger flexible prong 51a may then be detachably secured to the portion 17 as described hereinbefore.

Figure 5:
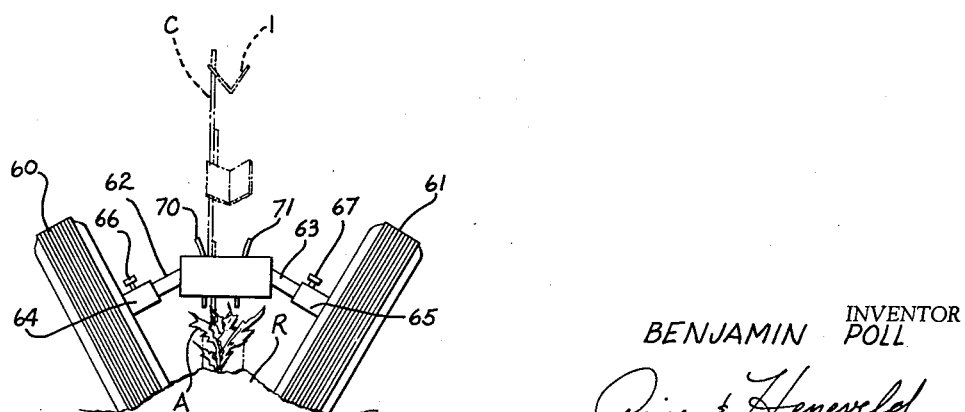
FIG. 5 is a rear view of the planting machine, showing the new and improved adjustable furrow-closing means, comprising a part of this invention.

In this regard, as will be noted from FIG. 5, wheels 60 and 61 are provided to close the furrow around the pots which have been planted to provide the necessary rigidity and support thereto. The wheels 60 and 61 are mounted rearwardly of the conveying means C on a pair of rigid shafts 62 and 63 and include respective hubs 64 and 65. The wheels are adapted to rotate about the hubs 64 and 65. Set screws 66 and 67 detachably secure the hubs 64 and 65 to the shafts 62 and 63. It will be noted that this allows the operator to quickly and simply adjust the spacing between the wheels 60 and 61. When planting pots of a small size, the wheels must be relatively close together. However, when planting pots of a larger size, the wheels must be spaced further apart. When the operator substitutes larger flexible prongs, he may also adjust the spacing between the wheels 60 and 61.

Operation

As described in my Patent No. 2,739,548 issued March 27, 1956, a plurality of arms 1 move in a circuitous fashion along a furrow dug by the planting machine. The operator places a pot P (shown in FIG. 1) on the supporting prong 30 between the flexible prongs 50 and 51. The foliage of the plant A in the pot P rests between the guard shields 44 and 45. With the pot thus placed on the arm 1, the arm moves downwardly toward the furrow and engages a pair of cam plates 70 and 71 (FIGS. 4 and 5) as described in my Patent No. 2,739,548. The roller followers 40 and 41 engage the plates 70 and 71, biasing the clamping members 15 and 16 toward each other, the roller followers creating very little friction. As the clamping members close, the flexible prongs 50 and 51 exert pressure on the sides of the pot P. However, these prongs flex in a manner such that the pot is not crushed, although a firm grip is maintained thereon. It will now be noted that the pot P will be firmly held along three of its sides, assuring a positive grip thereon. When each arm emerges from between the plates 70 and 71, the spring 25 quickly forces the clamping members 15 and 16 to maximum open position. At this time, the pot P is completely released and deposited in the furrow. As successive arms move through the shields, successive pots are planted in the furrow, the furrow being covered by the wheels 60 and 61 forming a ridge of dirt R about the pot.

It will now be understood that a carrying arm has been provided which facilitates the planting of potted plants with machines of the character described. The structure of the planting arm is such that the pots are grasped in a firm three point grip. However, two of the prongs grasping the pot are flexible so that the pot is not damaged. The prongs are easily and quickly detached from the arm, making it possible to substitute prongs adapted to receive larger pots. Further, the covering wheels of the machine are quickly and simply adjustable so that a proper ridge of dirt may be placed about pots of varying sizes. A spring means has been provided which effects the divergent movement of the flexible prongs very quickly and simply. The foliage of the plant is not damaged, being protected by the guard shields. Practically no friction results from the passage of this arm through the shields due to the roller followers provided on each clamping member.

While only one embodiment of this invention has been shown and described, it may be possible to practice the invention through the use of certain other embodiments. These other embodiments are to be included within the spirit and scope of this invention as defined by the following claims.

I claim:

1. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of arms each having free end portions of substantially greater flexibility than the remaining part of said arm forming flexible prong portions extending from said base, said flexible prong portions lying generally parallel to each other and to said supporting prong and spaced therefrom; and means for engaging said remaining parts for moving said remaining parts and for effecting movement of said flexible prong portions toward each other whereby said supporting prong and said flexible prongs form a three point grip on a pot.

2. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of rods secured to said base having portions thereof lying in spaced relation to each other and to said base and spaced therefrom; a flexible prong having substantially greater flexibility than said pair of rods secured to an end of said portion of each of said rods, said flexible prongs lying in spaced, generally parallel relation to each other and said supporting prong and spaced therefrom; and means for moving said rods toward each other for effecting movement of said flexible prongs toward each other whereby said supporting prong and said flexible prongs form a three point grip on a pot.

3. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of rods secured to said base having portions thereof lying in spaced relation to each other and to said base; a flexible prong detachably secured to an end of said portion of each of said rods, said flexible prongs lying in spaced, generally parallel relation to each other and said supporting prong; each detachable flexible prong including an elongated flexible member having an opening in one end slidably receiving said portion of its associated rod and a clamping member slidably enveloping said end of said portion and said flexible member, said flexible member forceably bent toward and held against said associated rod, frictionally binding the edges of said opening against said associated rod; and means for moving said flexible prongs toward each other whereby said supporting prong and said flexible prongs form a three point grip on a pot.

4. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of rods secured to said base having portions thereof lying in spaced relation to each other and to said base; a flexible prong detachably secured to an end of said portion of each of said rods, said flexible prongs lying in spaced, generally parallel relation to each other and said supporting prong; each detachable flexible prong including an elongated flexible member having an opening in one end slidably receiving said portion of its associated rod and a clamping member slidably enveloping said end of said portion and said flexible member, said flexible member forceably bent toward and held against said associated rod, frictionally binding the edges of said opening against said associated rod; collars frictionally positioned on said ends of said portions of said rods, said collars preventing movement of said clamping members off said ends; and means for moving said flexible prongs toward each other whereby said supporting prong and said flexible prongs form a three point grip on a pot.

5. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of arms each having free end portions of substantially greater flexibility than the remaining part of said arm forming flexible prong portions extending from said base, said flexible prong portions lying generally parallel to each other and to said supporting prong and spaced therefrom; a generally V-shaped spring, the vertex of said spring positioned around said base and the legs of said spring extending between the remaining parts of said arms and biasing said flexible prongs apart; means for limiting the parting of said flexible prongs; and means for engaging said remaining parts for moving said remaining parts and effecting movement of said flexible prongs toward each other whereby said supporting prong and said flexible prongs form a three point grip on a pot.

6. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of rods secured to said base having portions thereof lying in spaced relation to each other and to said base and spaced therefrom; a flexible prong having substantially greater flexibility than said pair of rods secured to an end of said portion of each of said rods, said flexible prongs lying in spaced, generally parallel relation to each other and said supporting prong and spaced therefrom; a generally V-shaped spring, the vertex of said spring positioned around said base and the legs of said spring extending between said portions of said rods and biasing said portions apart; means for limiting the parting of said portions of said rods; and means for moving said rods toward each other for effecting movement of said flexible prongs toward each other whereby said supporting prong and said flexible prongs form a three point grip on a pot.

7. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of rods secured to said base having portions thereof lying in spaced relation to each other and to said base and spaced therefrom; a flexible prong having substantially greater flexibility than said pair of rods secured to an end of said portion of each of said rods, said flexible prongs lying in spaced, generally parallel relation to each other and said supporting prong and spaced therefrom; roller followers rotatably mounted on said portions of said rods; and means for moving said roller followers and thereby said rods toward each other for effecting movement of said flexible prongs toward each other whereby said supporting prong and said flexible prongs form a three point grip on a pot.

8. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of rods secured to said base having portions thereof lying in spaced relation to each other and to said base and spaced therefrom; a flexible prong having substantially greater flexibility than said pair of rods secured to an end of said portion of each of said rods, said flexible prongs lying in spaced, generally parallel relation to each other and supporting prong and spaced therefrom; a generally V-shaped spring, the vertex of said spring positioned around said base and the legs of said spring extending between said portions of said rods and biasing said portions apart; means for limiting the parting of said portions of said rods; roller followers rotatably mounted on said portions of said rods; and means for moving said roller followers and thereby said rods toward each other for effecting movement of said flexible prongs toward each other whereby said supporting prong and said flexible prongs form a three point grip on a pot.

9. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of rods secured to said base having portions thereof lying in spaced relation to each other and to said base and spaced therefrom; a flexible prong having substantially greater flexibility than said pair of rods secured to an end of said portion of each of said rods, said flexible prongs lying in spaced, generally parallel relation to each other and said supporting prong and spaced therefrom; a generally V-shaped spring, the vertex of said spring positioned around said base and the legs of said spring extending between said portions of said rods and biasing said portions apart; means for limiting the parting of said portions of said rods; roller followers rotatably mounted on said portions of said rods; guard shields secured to said rods, said guard shields lying between said portions of said rods and said base; and means for moving said roller followers and thereby said rods toward each other for effecting movement of said flexible prongs toward each other whereby said supporting prong and said flexible prongs form a three point grip on a pot.

10. A pot grasping arm for planting potted plants for use in a planting machine having conveying means with a circuitous movement and a plurality of such arms mounted each at one end in spaced relation on the conveying means, said pot grasping arm comprising: a base; means for securing one end of said base to said conveying means; a supporting prong extending from the other end of said base; a pair of rods secured to said base having portions thereof lying in spaced relation to each other and to said base; a flexible prong detachably secured to an end of said portion of each of said rods, said flexible prongs lying in spaced, generally parallel relation to each other and said supporting prong; each detachable flexible prong including an elongated flexible member having an opening in one end slidably receiving said portion of its associated rod and a clamping member slidably enveloping said end of said portion and said flexible member, said flexible member forceably bent toward and held against said associated rod, frictionally binding the edges of said opening against said associated rod; a generally V-shaped spring, the vertex of said spring positioned around said base and the legs of said spring extending between said portions of said rods and biasing said portions apart; means for limiting the parting of said portions of said rods; roller followers rotatably mounted on said portions of said rods; guard shields secured to said rods, said guard shields lying between said portions of said rods and said base; and means for moving said flexible prongs toward each other whereby said supporting prong and said flexible prongs form a three point grip on a pot.

References Cited in the file of this patent
UNITED STATES PATENTS

| | | |
|---|---|---|
| 1,026,492 | Bruhn | May 14, 1912 |
| 1,596,678 | Miller | Aug. 17, 1926 |
| 2,819,113 | Phillips | Jan. 7, 1958 |
| 2,853,962 | Cease | Sept. 30, 1958 |

FOREIGN PATENTS

| | | |
|---|---|---|
| 1,066,788 | Germany | Oct. 8, 1959 |
| 454,387 | Great Britain | Sept. 30, 1936 |